ically-United States Patent [19]

Hudon

[11] 4,448,389

[45] May 15, 1984

[54] OPERATING DEVICE FOR A CYLINDRICAL GATE

[76] Inventor: Paul Hudon, 9100 de Charente, Tracy, Canada

[21] Appl. No.: 349,317

[22] Filed: Feb. 16, 1982

[30] Foreign Application Priority Data

Mar. 12, 1981 [CA] Canada .................. 372843

[51] Int. Cl.³ .......................................... F16K 31/163
[52] U.S. Cl. ......................................... 251/62; 91/515; 92/33; 92/76; 92/146; 251/144; 251/326
[58] Field of Search .................. 251/62, 144, 326; 91/515; 92/33, 76, 146

[56] References Cited

U.S. PATENT DOCUMENTS

| | | | |
|---|---|---|---|
| 2,494,634 | 1/1950 | Schmidt | 251/326 |
| 3,226,078 | 12/1965 | Anderson | 251/62 |
| 3,307,574 | 3/1967 | Anderson | 251/62 |
| 3,463,193 | 8/1969 | Yost | 251/326 |
| 3,515,033 | 6/1970 | Geyer | 92/76 |
| 3,957,245 | 5/1976 | Daghe | 251/326 |
| 4,201,365 | 5/1980 | Paptzun et al. | 251/326 |
| 4,288,059 | 9/1981 | Gurbin | 251/62 |

Primary Examiner—Ronald C. Capossela
Attorney, Agent, or Firm—Cushman, Darby & Cushman

[57] ABSTRACT

The safety device includes a self-closing cylindrical gate which, in closed position, blocks the hydraulic conduit surrounding the hydraulic turbomachine; the gate is housed, in the open position, in a chamber including two components near the hydraulic conduit defining wth the gate two orifices situated upstream and downstream with respect to the gate; pressure on top of the gate takes an intermediate value between the upstream and downstream pressures, and is determined by the ratio of the product of the discharge coefficient with the passage cross-section upstream orifice over the product of the discharge coefficient with the passage cross-section downstream orifice, so that a pressure is exerted on the upper edge of the gate, resulting in a force which tends to move the gate to close the hydraulic conduit.

17 Claims, 3 Drawing Figures

OPERATING DEVICE FOR A CYLINDRICAL GATE

This invention concerns a safety device to protect hydraulic turbo-machines and particularly, such a device using a self-closing cylindrical gate, also called self-closing ring gate.

When required, gates are installed at the lower ends of penstocks on hydro-electric installations upstream from the machines to protect the power-house and provide a watertight seal during stoppages. It is well known that classical solutions such as butterfly valves and spherical valves, are rather expensive. The cylindrical valve provides adequate protection and water-tightness at a lower cost; it is situated around the hydraulic turbo-machine and is located between the distributor and the stay ring or between the distributor and the runner or upstream from the stay vane. It can be operated downward or upward on vertical units, and in an analogous transposed manner on horizontal or inclined units.

This invention concerns a cylindrical gate and its operating mechanism capable of closing without an external power source, in still water as well as under full flow conditions; of establishing and maintaining sealing in hydro-electric installations using Francis, Kaplan or Helical turbines, pumps or pump-turbines with radial inlet or outlet. This gate is said to be self-closing because it can close without an external power source, in still water and under flow conditions establish and maintain sealing. This self-closing ability is particularly interesting for this device when used as a safety device to protect hydraulic turbo-machines since closing of the gate is guaranteed even in the event that the power-house would not have the current or accumulated energy required to move a gate that would not be self-closing.

The self-closing ability of the cylindrical gate, which is the object of this invention, results from the following two points:

(1) achieving a closing force, resulting from the hydraulic pressures and the weights of the moving parts, which always tends to close the gate.

(2) using a reversible operating device, i.e., a device actuated by the load, for any encountered value of the operating force.

The safety device in this invention includes a housing defining a chamber which receives the cylindrical gate in the open position.

The operating force results from the algebraic sum of the force exerted by the pressure in the chamber on the effective exposed cross-section of the top of the gate, also called upper edge, the force exerted on the bottom, also called bottom lip, by the average pressure at that point, the weight of the gate and of the contributing parts in the operating mechanism.

The profile of the bottom lip of the gate does not by itself determine completely the direction of the resulting operating force. Actually, the force at this point is only a part of the total force. However it affects the pressure distribution on the bottom of the gate and consequently it determines the force at this point. The design of the bottom lip is determined in principle by considerations such as energy losses, cavitation and the need for a lower sealing edge.

The gate chamber is connected with the hydraulic conduit of the turbo-machine by two passages situated respectively upstream and downstream from the gate, these being the upstream and downstream orifices. The pressure in the gate chamber takes on an intermediate value between the pressure upstream from the gate and the pressure downstream from the gate. The pressure differential upstream and downstream from the gate is due to the different cross-section of the conduit upstream and downstream from the gate near the gate, and also, to the pressure drop due to the presence of the gate in the flow during a closure.

The pressure in the gate chamber is a function of the discharge coefficient and of the geometry (shape and area) of each orifice. The area of the upstream orifice is determined by the clearance between the upstream wall of the chamber and the upstream face of the gate. The area of the downstream orifice is determined by the clearance between the downstream wall of the chamber and the downstream face of the gate.

In this invention, the ratio between the upstream and downstream orifices is carefully chosen to achieve the desired intermediate value between the upstream and downstream pressures in the gate chamber. In this way, the pressure applied on the upper edge of the gate can be made equal to/or greater than the average pressure on the lower edge, for any position of the gate and for any flow condition.

Therefore this invention concerns a safety device to protect a hydraulic turbo-machine provided with a hydraulic conduit, including: a self-closing cylindrical gate blocking the hydraulic conduit when closed, such cylindrical gate comprising an upstream face and a downstream face, an upper edge and a bottom lip; and a chamber containing the cylindrical gate in open position, such chamber comprising two parts near the hydraulic conduit and connected to the hydraulic conduit by two orifices situated upstream and downstream respectively from the gate, each of these orifices having a cross-section area and a discharge coefficient; the pressure on the upper edge taking an intermediate value between the upstream and downstream pressures in the hydraulic conduit in the vicinity of the orifices; such value being determined by the ratio of the product of the orifice discharge coefficient and the passage cross-section upstream with the product of the orifice discharge coefficient and the passage cross-section downstream to produce a force on upper edge allowing to obtain a resulting operating force in the direction of gate closure.

Another characteristic of this invention is the possibility of varying the ratio of the upstream and downstream orifices in the gate chamber as a function of the position of the gate by undercutting or changing the shape of the upstream and/or downstream faces of the gate and/or chamber. The advantage of exerting such a variable control on the pressure inside the gate chamber at all times during the displacement of the gate to achieve a resultant which tends to close the gate, is that the resulting operating force can be modulated as a function of the position of the gate in order to reduce the capacity of the operating device required during flow shut-off. Actually, the pressure at all times during the displacement of the gate can be controlled in order to produce a resultant force of sufficient amplitude to provide a resulting operating force tending to close but with a controlled amplitude. It follows also from the variable control feature of the pressure in the gate chamber as a function of the upstream and downstream pressures on the gate, that the closing speed of the gate during flow shut-off can be varied as a function of its position since the operating force results in a back-pressure in the lower chamber of the linear hydraulic servomotors used in the operating mechanism, these being connected to the gate with operating rods. Due to this ability to regulate the rate of descent, pressure surges resulting from flow shutoff by the gate can be reduced.

In still water and when the (upstream - downstream) pressure differential is not large enough to provide, with the other components of the operating force, a resultant tending to close due to the presence of the operating rods, one or more compensation areas can be provided to cancel the effect of this presence.

In one application of this invention, a synchronizing device is used to interconnect some servomotors in order to ensure a uniform motion of the gate.

In a variant of this invention, compensating areas are provided above the gate in order to balance a hydraulic pressure opposing closure and resulting from the action of the pressure on the area of the operating rods. Thus, in addition to the servomotors, a separate mechanism is provided to act upon the gate, or else, according to a variant, the upper chamber of some or all the servomotors is designed for this compensation.

Other characteristics and advantages of this invention will be apparent from the following description of an embodiment concerning a safety device for a hydraulic turbo-machine, based upon the attached drawings wherein.

Figure 1:
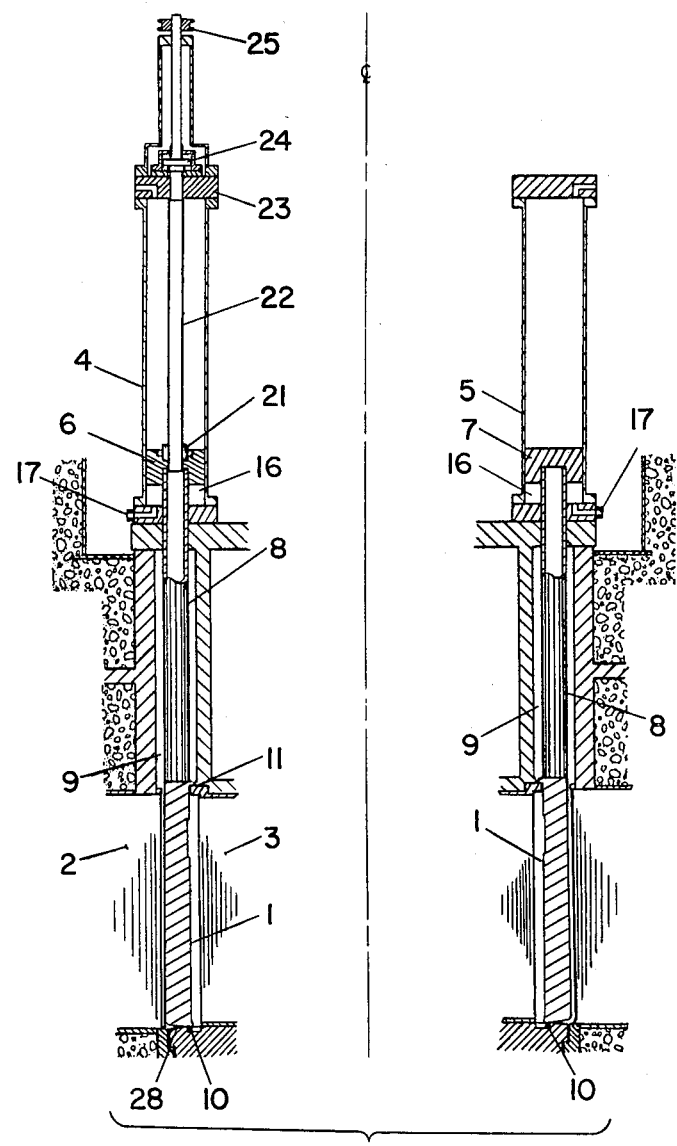
FIG. 1 is a front view of a section of a cylindrical gate and two servomotors connected to the gate.

In FIG. 1, a cylindrical gate 1 is shown in closed position placed between the stay ring 2 and the distributor 3 of a hydraulic turbo-machine (not shown). This gate is operated by the single acting linear hydraulic servomotors located above the circumference of the gate; FIG. 1 shows two of these operating servomotors 4 and 5. Pistons 6 and 7 of servomotors 4 and 5 are connected to gate 1 by operating rods 8 crossing cylindrical pit above the gate defining a cylindrical chamber 9.

Chamber 9 of the gate connects with the hydraulic conduit of the turbo-machine by means of two openings 12 and 13 located, respectively, upstream and downstream with respect to the gate.

Figure 2:
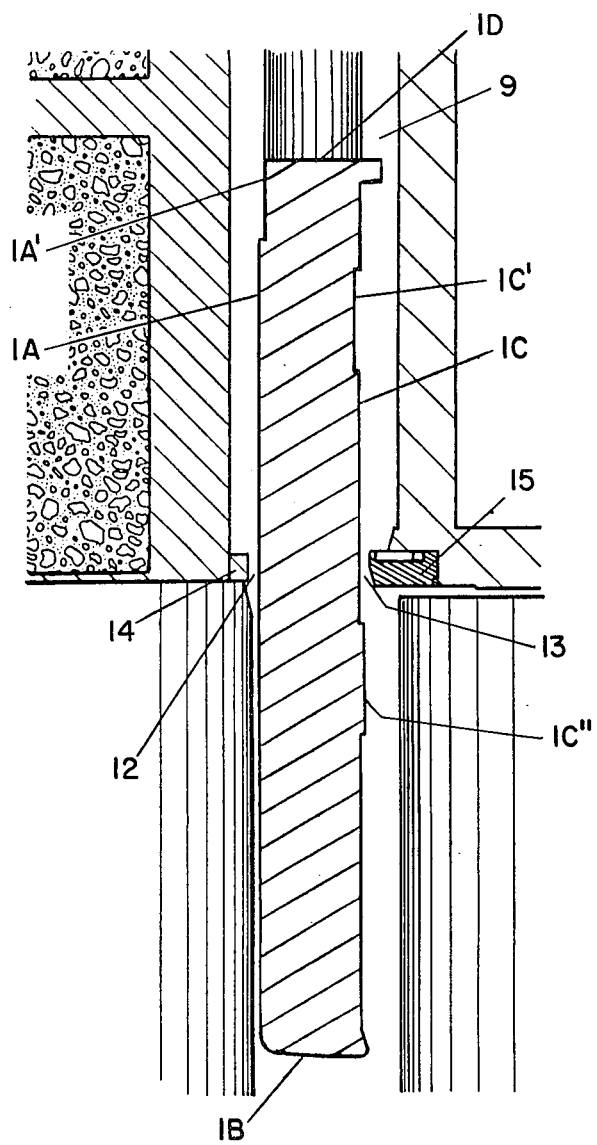
FIG. 2 is an enlarged cross-section of the gate in half-open position in the hydraulic conduit.

Referring to FIG. 2 the gate has an upstream face 1A and a downstream face 1C, and a bottom lip 1B and an upper edge 1D. Thus, the operating force results from the algebraic sum of the thrust exerted by the pressure in gate chamber 9 on the effective cross-section of the upper edge 1D, the thrust exerted on the bottom lip 1B by the average pressure at this point, the weight of the gate and of the contributing parts of the operating mechanisms. The pressure in gate chamber 9 takes an intermediate value between the pressure upstream and the pressure downstream from the gate. The difference between the pressure upstream and the pressure downstream from the gate is caused by the change in cross-section of the stay ring 2 and the distributor 3 near the gate, and the pressure drop caused by the gate when engaged in the flow. The pressure in the gate chamber is a function of the geometry (shape and cross-section) of each of the openings 12 and 13. The cross-section of orifice 12 is determined by the stationary part 14 on the upstream wall, and the upstream face 1A of the gate. The cross-section of orifice 13 is determined by the clearance between stationary part 15 on the downstream wall and the downstream face 1C of the gate.

The flow of an incompressible fluid across an orifice is a function of the pressure differential through the orifice and is given by the formula:

$$Q = C_0 A_0 \sqrt{\frac{2\Delta P}{p}} \qquad (1)$$

Where:
Q = Flow
$C_0$ = Orifice discharge coefficient
$A_0$ = Orifice cross-section area
$\Delta P$ = Pressure differential through the orifice
p = Specific gravity of the fluid In this system, the following variables are chosen.
$P_1b$ = Average pressure on lower edge of the gate
$P_2$ = Pressure upstream from the gate near orifice 12
$P_3$ = Pressure downstream from the gate near orifice 13
$P_9$ = Pressure in gate chamber
$C_{12}$ = Discharge coefficient for orifice 12
$C_{13}$ = Discharge coefficient for orifice 13
$A_{12}$ = Passage section for orifice 12
$A_{13}$ = Passage section for orifice 13

The flow through orifice 12 is equal to the flow through orifice 13 so that:

$$C_{12} A_{12} \sqrt{P_2 - P_9} = C_{13} A_{13} \sqrt{P_9 - P_3} \qquad (2)$$

Then the pressure in the gate chamber can be expressed as a function of pressures $P_2$ and $P_3$, and orifices 12 and 13.

$$P_9 = \frac{P_3 + \gamma P_2}{1 + \gamma}$$

Where:

$$\gamma = \left[ \frac{C_{12} A_{12}}{C_{13} A_{13}} \right]^2$$

In this invention, $\gamma$ is chosen so that the pressure in the gate chamber is greater than or equal to the average pressure on the bottom of the gate. This condition is written as:

$$\gamma = \frac{P_1b - P_3}{P_2 - P_1b} \; 5$$

Numerical example:
Data:
Gate 50% closed:

$$P_2 = 100 \qquad P_3 = 80 \qquad P_1b = 90$$

transfering these values into equation (5), we find $\gamma = 1$
Gate 90% closed:

$$P_2 = 100 \qquad P_3 = 20 \qquad P_1b = 25$$

We find $\gamma = 1/15$

When the orifices have constant cross-section, a value of 'γ' must be found to satisfy equation (5) for all positions of the gate and all conditions of flow. Thus in the numerical example given above, 'γ' should be at least equal to 1. Then with the gate 90% closed, the pressure in the chamber according to equation (3) is:

$$p_9 = \frac{20 + 1 \times 100}{1 + 1} = 60$$

The hydraulic force applied to the gate is therefore greater at 90% closure than it is at 50% closure.

In a variant of this invention, 'γ' can be varied by machining grooves and/or protuberances on the upstream and/or downstream faces and/or on the upstream and/or downstream walls of the chamber, as in 1A', 1C', 1C" in FIG. 2.

Thus, in the preceding numerical example, one could set 'γ'=1/15, which would satisfy equation (5) for 90% closure and provide the same operating force as for 90% closure.

When the closing operation is done in still water, the pressure is balanced all around the gate. Under these conditions, the force resulting from the pressures on the upper and the lower edges of the gate is equal to the product of the upstream head pressure by the area intercepted by the operating rods above the gate. Similar conditions exist when the gate starts to close under flow, the upstream-downstream pressure differential being almost zero.

In the situation discussed here the gate closes downward and the operating servomotors are located above the gate, so that the force is subtracted from the weights of the submerged parts, and opposes closure. Nevertheless the resultant must remain large enough to overcome the friction, however small, of the operating mechanism.

For low head installations, the gate is heavy because the hydraulic ducts are large due to the large flow. Also the pressure is relatively low so that it is generally possible to maintain a downward resultant. On the other hand, for high head installations, the gate is lighter because the duct is small. Also the pressure is high, and it is not always possible to achieve a downward resultant. However gates could be made artificially thick and heavy but the cost would be higher and the housing for the gate would be less rigid. Weights could also be used to push against the gate but the space is not always available.

To get around these difficulties, the hydraulic forces, in still water or at the beginning of the closing stroke must always be directed downward and add up to the weights of the parts. As a matter of fact, it is possible to locate the servomotors below the gate, the gate closing downward. However, the disadvantage with this design is that the operating rods are in the flow when the turbo-machine is in operation.

When gates are installed under high head conditions, if the resultant operating force is directed upwards, the servomotors can also be placed above the gate, the gate closing upwards. Again the disadvantage with this design is that the operating rods are in the flow when the turbo-machine is in operation.

If the gate was installed on a horizontal unit, the weights would not be in the operating direction, and only the pressure exerted on the area of the rods could be used, unless counter-weights are installed.

In this invention the hydraulic pressure working against closure, and resulting from the pressure acting over the areas of the operating rods is compensated, when necessary, to achieve an operating force always in a direction of gate closure, and large enough to overcome the friction in the operating mechanism.

These forces are balanced by admitting full head pressure on compensating areas located above the gate in separate devices from operating servomotors or else in the upper chamber of all or some operating servomotors, which become then double-acting.

Figure 3:
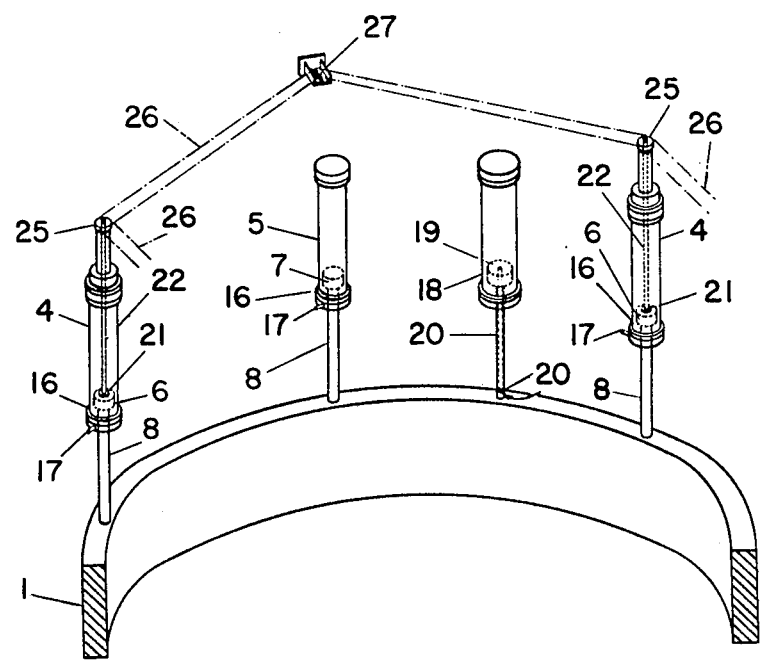
FIG. 3 is a perspective half-view showing the arrangement of some servomotors above the cylindrical gate.

In FIG. 3 a cylinder 18 is shown. Head pressure is taken from orifice 20' at lower end of rod 20. Pressure could also be provided by a line from the penstock. Pressure is exerted on piston 19, being the compensating area which pushes against the gate by means of rod 20.

Sealing is established and maintained by the full head pressure exerted on the area of the circle delineated by the sealing edge of the lower seal minus the area of the circle delineated by the sealing edge of the upper seal, added algebraically to the weight of the gate, and the force on the operating rods.

As shown in FIG. 1 the diameter of the upper seal 11 installed on a stationary part downstream from the gate is smaller than the diameter of the lower seal 10 installed in the sill 28 of the gate. Other possible arrangements might include:

an upper seal installed on the gate with a lower seal installed in the sill;

or, an upper seal installed on the gate and a lower seal installed in the lower edge of the gate;

or, an upper seal installed on stationary parts and a lower seal installed on the gate.

Sealing is established as follows: as the upper seal 11 nears its sealing edge, the pressure rises in the gate chamber until it reaches the upstream pressure, whereas at sill 28 the head pressure is converted partly or completely into kinetic energy. Diameters 10 and 11 are chosen to provide the required resultant force to establish sealing at both joints and to maintain sealing with full head pressure.

The operating mechanism which is used with this gate will now be described. The gate is operated on by a set of N single acting servomotors (at least three) preferably but not necessarily laid out so that the operating force is distributed uniformly. It can be seen in FIG. 3 that each servomotor includes a piston 6 or 7, connected to gate 1 with an operating rod 8.

When the gate is opened the pressurized fluid, water or oil for example, feeds into the lower chamber 16 of the parallel connected servomotors. When the gate is closed, the fluid is expelled from lower chamber 16 of the servomotors by piston 6 or 7, on which the resulting operating force acts. Orifice 17 controls the closing speed and is placed at the outlet of each servomotor. These orifices are generally identical and the oil flows into a manifold (not shown).

Out of the N servomotors a minimum of three are connected together by a synchronizing device which maintains uniform motion of the gate 1. These three servomotors are distributed uniformly. This is preferable but not mandatory.

It would also be possible to connect all the servomotors with the synchronizing device. If this is not the case, those servomotors that are not connected to the synchronizing device are synchronized by the gate itself.

Servomotor 4 in FIG. 1 is equipped with a roller nut 21 attached to piston 6, causing it to move in translation but preventing it from rotation. Through the nut 21 passes a threaded rod 22 which is maintained on cover 23 of the servomotors by thrust bearings 24 which prevent the rod from moving axially while leaving it free to rotate. The translation motion of piston 6 causes rod 22 to rotate by means of nut 21.

In a different arrangement the threaded rod could be attached solidly to the piston so that it can move in translation but prevented from rotation. The nut should then be mounted on the cover, maintained axially by thrust bearings but free to rotate.

In this arrangement, the translation motion of the threaded rod, as caused by the piston, would force the nut to rotate.

In FIG. 3, sprockets 25 are shown mounted on threaded rod 22. Chain loops 26 held tight by tensioners 27 connect servomotors 4 together to ensure uniform operation of gate 1 by means of reversible nut and screw systems 21, 22.

Another variant would be to use as a synchronizing link for the rotating member:
sprockets with continuous chains;
gearbelts and pulleys;
gears with rigid or flexible shafts.

As well as maintaining a uniform motion of the gate while closing or opening, the synchronizing mechanism can also transfer forces between interconnected servomotors so that the load is more evenly distributed.

The above description was in reference to a cylindrical gate operating vertically downward with the servomotors placed above the gate. Servomotors can also be installed under the gate. Also, as mentioned above, this invention refers to a cylindrical gate operating vertically upward when the chamber wherein the pressure is exerted, would be located under the hydraulic conduit, and the forces would be exerted on the bottom lip of the gate, with the servomotors either above or below the gate. Similarly, this invention refers also to a cylindrical gate moving along a horizontal or inclined axis as well as vertical. Therefore this invention should be interpreted in a restrictive manner only by the extents of the following claims.

What is claimed is:

1. A safety device to protect a hydraulic turbomachine equipped with a hydraulic conduit, including:
    a self-closing cylindrical gate which blocks, when closed, the hydraulic conduit, said cylindrical gate having an upstream face and a downstream face, an upper edge and a bottom lip; and a chamber receiving the gate in open position, said chamber comprising an upstream orifice defined by an opening between said upstream face of said gate and a stationary part of said chamber and a downstream orifice defined by another opening between said downstream face of said gate and another stationary part of said chamber, each said orifice having a selected discharge coefficient and cross-sectioned area such that, when said chamber is filled with liquid a force will be exerted on the upper edge of said gate to move said gate to close the hydraulic conduit.

2. A device according to claim 1, where the profiles of the upstream and downstream faces of the gate are chosen so that a variable control is exerted on the pressure in the chamber as a function of the position of the gate with respect to said stationary parts of the chamber.

3. A device according to claim 1, including an upper seal installed on one of the stationary parts downstream from the gate and a lower seal installed in a sill in the hydraulic conduit below the gate.

4. A device according to claim 1, including an upper seal installed on the gate and a lower seal installed in a sill in the hydraulic conduit below the gate.

5. A device according to claim 1, including an upper seal installed on the gate, and a lower seal installed in the lower edge of the gate.

6. A device according to claim 1, including an upper seal installed on one of the stationary parts and a lower seal installed on the gate.

7. A device according to claim 1, including an operating mechanism equipped with linear hydraulic servomotors installed above the gate and connected to the gate with operating rods.

8. A device according to claim 7, where each servomotor includes a lower chamber containing a fluid; said fluid being expelled from the lower chamber of the servomotor by the action of the resulting operating force through an orifice located at the outlet of said lower chamber for each servomotor, said orifice being used to control the closing speed of the gate.

9. A device according to claim 7, where a minimum of three servomotors are interconnected by a synchronizing device.

10. A device according to claim 9, where the interconnected servomotors include a piston and a roller nut attached to said piston; a threaded rod going through said nut and maintained by thrust bearings to prevent axial displacement of the rod while leaving it free to rotate; a translation of said piston causing the threaded rod to rotate by means of said nut.

11. A device according to claim 10, including sprockets mounted on the threaded rods, and tensioned chain loops interconnecting the servomotors so that the operation of the gate is uniform.

12. A device according to claim 7, where all the servomotors are interconnected by a synchronizing device.

13. A device according to claims 9 or 12, wherein the interconnected servomotors include a piston and a threaded rod attached to said piston; and a nut maintained axially by thrust bearings and free to rotate, to prevent the rod from rotating whereby translation of threaded rod, caused by piston, forces rotation of said nut.

14. A device according to claim 7, including compensating devices above the gate in order to compensate hydraulic forces opposing closure of the gate.

15. A device according to claim 14, wherein the compensation devices are separate from the servomotors used in the operating mechanism, and are made of a cylinder and a piston connected to the gate.

16. A device according to claims 7 or 14 wherein the compensating devices are installed in an upper chamber of the operating servomotors.

17. A safety device to protect a hydraulic turbomachine equipped with a hydraulic conduit including:
    a self-closing cylindrical gate blocking, when closed, the hydraulic conduit, said cylindrical gate including an upstream face, a downstream face and opposite edges;
    said device including a chamber to house said cylindrical gate when said gate is in an open position, said chamber comprising two stationary parts, near said hydraulic conduit, defining with the gate two orifices located respectively upstream and downstream with respect to said gate;

each said orifice having a passage section and an orifice discharge coefficient which varies with the cross-sectional area of each said orifice; at least one of said faces of said gate being relieved along portions thereof so that as said gate passes said associated stationary part, said cross-sectional area of said orifice will vary to thereby vary said orifice discharge coefficient to thereby vary the force exerted on the portion of said gate located in said chamber as said gate is moved to close said hydraulic conduit.

* * * * *

UNITED STATES PATENT AND TRADEMARK OFFICE
CERTIFICATE OF CORRECTION

PATENT NO. : 4,448,389
DATED : May 15, 1984
INVENTOR(S) : Paul HUDON

It is certified that error appears in the above–identified patent and that said Letters Patent are hereby corrected as shown below:

Please delete the present title of the invention and substitute the following new title:

SAFETY DEVICE FOR A SELF-CLOSING CYLINDRICAL GATE FOR A HYDRAULIC TURBO-MACHINE

Signed and Sealed this

Thirteenth Day of November 1984

[SEAL]

Attest:

GERALD J. MOSSINGHOFF

Attesting Officer

Commissioner of Patents and Trademarks